United States Patent [19]
O'Brien et al.

[11] Patent Number: 5,706,120
[45] Date of Patent: Jan. 6, 1998

[54] DEVICE FOR CONTROLLING AN AMOUNT OF LIGHT ALLOWED TO REACH A PHOTOSENSITIVE SURFACE

[75] Inventors: Michael Joseph O'Brien, Rochester; Robert Cooper Bryant, Honeoye Falls; Richard Alexander Colleluori, Rochester, all of N.Y.

[73] Assignee: Eastman Kodak Company, Rochester, N.Y.

[21] Appl. No.: 639,064

[22] Filed: Apr. 24, 1996

[51] Int. Cl.⁶ .................................................. G02B 26/02
[52] U.S. Cl. .......................... 359/230; 359/227; 396/469; 396/493
[58] Field of Search ........................... 359/227, 230; 396/457–461, 463–464, 493–497, 506, 509, 510, 469, 508, 501; 250/231.1, 231.18

[56] References Cited

U.S. PATENT DOCUMENTS

| | | |
|---|---|---|
| 4,060,313 | 11/1977 | Konda . |
| 4,322,145 | 3/1982 | Yamada et al. . |
| 4,384,778 | 5/1983 | Lee et al. . |
| 4,558,938 | 12/1985 | Petersen . |
| 4,596,453 | 6/1986 | Fujino et al. . |
| 4,623,233 | 11/1986 | Yamada et al. . |
| 4,626,094 | 12/1986 | Saito . |
| 4,650,307 | 3/1987 | Capobianco et al. . |
| 4,714,966 | 12/1987 | Saito et al. . |
| 4,716,432 | 12/1987 | Stephany . |
| 4,743,108 | 5/1988 | Vogel et al. . |
| 4,751,543 | 6/1988 | Kodaira et al. . |
| 4,769,667 | 9/1988 | Ishiguro et al. . |
| 4,825,302 | 4/1989 | Tezuka et al. . |
| 4,835,564 | 5/1989 | Nakagawa et al. . |
| 4,839,679 | 6/1989 | Cameron et al. . |
| 4,851,870 | 7/1989 | Tanaka et al. . |
| 4,907,027 | 3/1990 | Kobe et al. . |
| 4,972,078 | 11/1990 | Hasebe et al. . |
| 5,325,142 | 6/1994 | Depatie et al. . |

*Primary Examiner*—James Phan
*Attorney, Agent, or Firm*—Charles E. Snee, III; David A. Howley

[57] ABSTRACT

A device for controlling an amount of light allowed to reach a photosensitive surface includes a movable light regulating member, an electrically conductive coil mounted to move with the member, a first permanent magnet having a north pole located adjacent a first side of the coil, and a second permanent magnet having a south pole located adjacent the first side of the coil. The invention is characterized by third and fourth permanent magnets located adjacent a second side of the coil. A north pole of the third magnet is located opposite the south pole of the second magnet and a south pole of the fourth magnet is located opposite the north pole of the first magnet. When electrical current is passed through the coil in one direction, the member is moved in a first direction, and when electrical current is passed through the coil in another direction, the member is moved in a second direction.

8 Claims, 6 Drawing Sheets

DEVICE FOR CONTROLLING AN AMOUNT OF LIGHT ALLOWED TO REACH A PHOTOSENSITIVE SURFACE

CROSS-REFERENCE TO RELATED APPLICATION

Reference is made to commonly assigned copending application Ser. No. 08/447,872, entitled Position Sensor With Half Tone Optical Gradient Wedge and filed in the names of O'brien et al. on May 23, 1995.

FIELD OF THE INVENTION

The invention relates generally to the field of imaging, and in particular to image capture. More specifically, the invention relates to a device for controlling an amount of light allowed to reach a photosensitive surface.

BACKGROUND OF THE INVENTION

U.S. Pat. No. 4,716,432 (the '432 patent), which issued in the name of Stephany on Dec. 29, 1987, discloses a non-focal plane shutter with an exposure control apparatus for controlling the amount of light admitted to a photosensitive surface. The apparatus includes an electromagnetic actuator having a pair of aperture blades which are biased towards a rest position and are movable away from the rest position to define an aperture. The aperture blades also function as a shutter. A control means regulates current supplied to the actuator to control aperture size and exposure time. In order to precisely control the exposure interval, the control means includes a means for continuously sensing the position of at least one of the aperture blades.

As can be seen in FIG. 1 of the '432 patent, a pair of armatures 116, 116' which overlie each other each include a shutter blade 118, 118'. Each armature has two spiral coils and is supported for pivotal movement by a pair of leaf springs which bias the armature towards a rest position. A strain transducer is mounted on one of the leaf springs of one of the armatures for monitoring the position of the aperture blade. A first permanent ceramic magnet 148 is arranged to produce magnetic fields in the vicinity of one of the coils on each armature. A second permanent ceramic magnet 148 is arranged to produce magnetic fields in the vicinity of the other coil on each armature.

The disclosure of the '432 patent employs only one blade position sensor, and assumes both blades have identical dynamic behavior. Such an arrangement can have less than optimal accuracy if both blades do not have identical dynamic behavior. Further, the overlapping drive coils on the two blades suffer from a high degree of electromagnetic interaction, making it difficult to accurately control shutter speed or aperture. The strain gauge sensor disclosed in the '432 patent is extremely sensitive to thermal drift, aging, and bond degradation, and therefore cannot be used as an absolute sensor to accurately determine blade position. Additionally, the leaf springs disclosed in the '432 patent would be susceptible to fatigue failure if applied to a focal plane shutter where extended movements of the shutter blades are required. Finally, the positioning of the permanent magnets on only one side of the coils provides a lower electromagnetic flux density than might be obtained, thereby reducing the speed obtainable by the blades.

SUMMARY OF THE INVENTION

The present invention is directed to overcoming one or more of the problems set forth above. Briefly summarized, according to one aspect of the present invention, a device for controlling an amount of light allowed to reach a photosensitive surface includes a movable light regulating member, an electrically conductive coil mounted to move with the member, a first permanent magnet having a north pole located adjacent a first side of the coil, and a second permanent magnet having a south pole located adjacent the first side of the coil. The invention is characterized by third and fourth permanent magnets located adjacent to a second side of the coil. A north pole of the third magnet is located opposite the south pole of the second magnet and a south pole of the fourth magnet is located opposite the north pole of the first magnet. When electrical current is passed through the coil in one direction, the member is moved in a first direction, and when electrical current is passed through the coil in another direction, the member is moved in a second direction.

By placing magnets adjacent both sides of the coil, a high electromagnetic flux density can be obtained in the gap between the magnets, thereby allowing extremely fast movement of the light regulating member.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
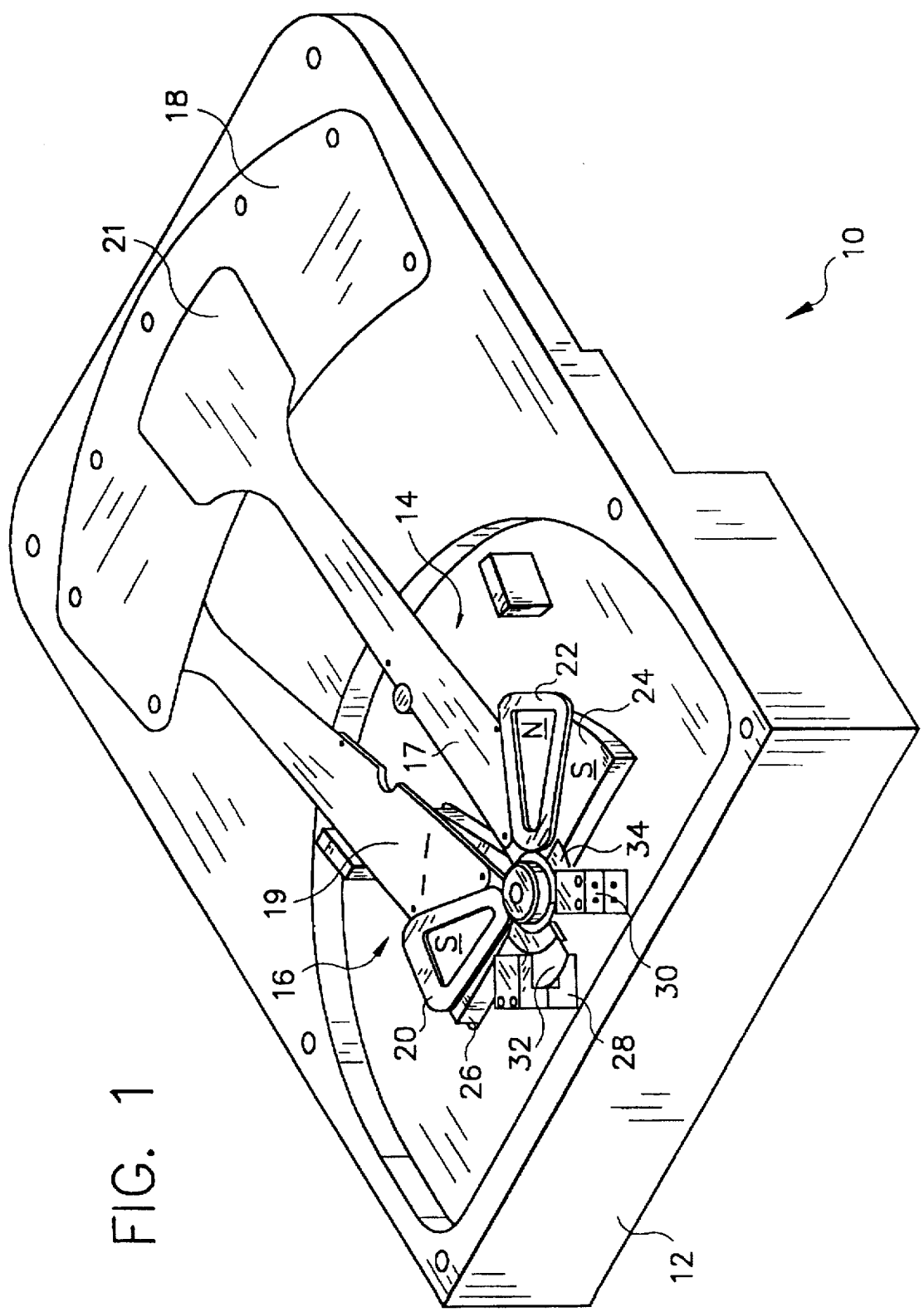
FIG. 1 is a perspective view of a focal plane shutter mechanism with its cover removed.

A view of a focal plane shutter mechanism 10 according to the present invention is illustrated in FIG. 1. A cover for the mechanism has been removed to facilitate viewing. The entire shutter mechanism is built on a base 12 to insure proper alignment and ease of assembly. The shutter mechanism includes two blade assemblies 14, 16 each having a respective shutter blade (movable light regulating member) 17, 19. The shutter blades are moved clockwise in succession, blade 19 following blade 17, to uncover and then cover an aperture in a blade separator 18 for passing light towards a photosensitive surface to record an image on the surface. The photosensitive surface can be, for example, a silver-halide film or a two dimensional array of charge-coupled devices. Each blade 17, 19 has a light regulating portion, respectively 21, 23, adjacent separator 18. Separator 18 prevents the edges of portions 21, 23 from hooking or colliding with each other during movement of the blades.

Electrically conductive actuator coils 20, 22 are mounted to move with their respective blade assembly. Two asymmetric magnet assemblies 24, 26 are located in pockets provided in base 12. These magnet assemblies, in combination with two more magnet assemblies in a cover (see FIG. 3), provide a magnetic field which causes a respective blade assembly to move in a first direction when electrical current is passed through a coil on that blade assembly. For example, blade 17 is shown in a home position in FIG. 1. The blade is held in this position by continuously running a small amount of current (e.g. 15 milliamps) through coil 22. Coil 22 is located over a first magnet of assembly 24 which has a north pole adjacent the coil. When the holding current in the coil is reversed and increased, the blade assembly is rapidly rotated clockwise until coil 22 is adjacent a second magnet of assembly 24 which has a south pole adjacent coil 22. When the direction of the current is again reversed, the blade assembly moves in a counterclockwise direction back to its home position. Coils 20, 22 do not overlap with each other during their movement, thereby greatly reducing electromagnetic interference between the two coils. The electrical current flowing in each coil can be individually controlled such that movement of each blade 17, 19 is individually controllable. Such an arrangement will be called a moving coil rotary actuator.

Two optical sensors 28, 30 for providing blade position feedback are also mounted on the base. Each sensor includes a radiation emitter (e.g. a light emitting diode (LED)) and a radiation detector (e.g. a photodiode) for sensing radiation from the emitter. The radiation is transmitted through an optical gradient density wedge, respectively 32, 34, mounted to move with its respective blade assembly. Each wedge includes a printed linear density gradient and will transmit an amount of radiation which depends on where the radiation is incident on the wedge. The precise position of each blade assembly can be determined from the electrical output of its associated radiation detector. Such an arrangement is disclosed in the above-mentioned cross-referenced patent application which is incorporated herein by reference.

Figure 2:
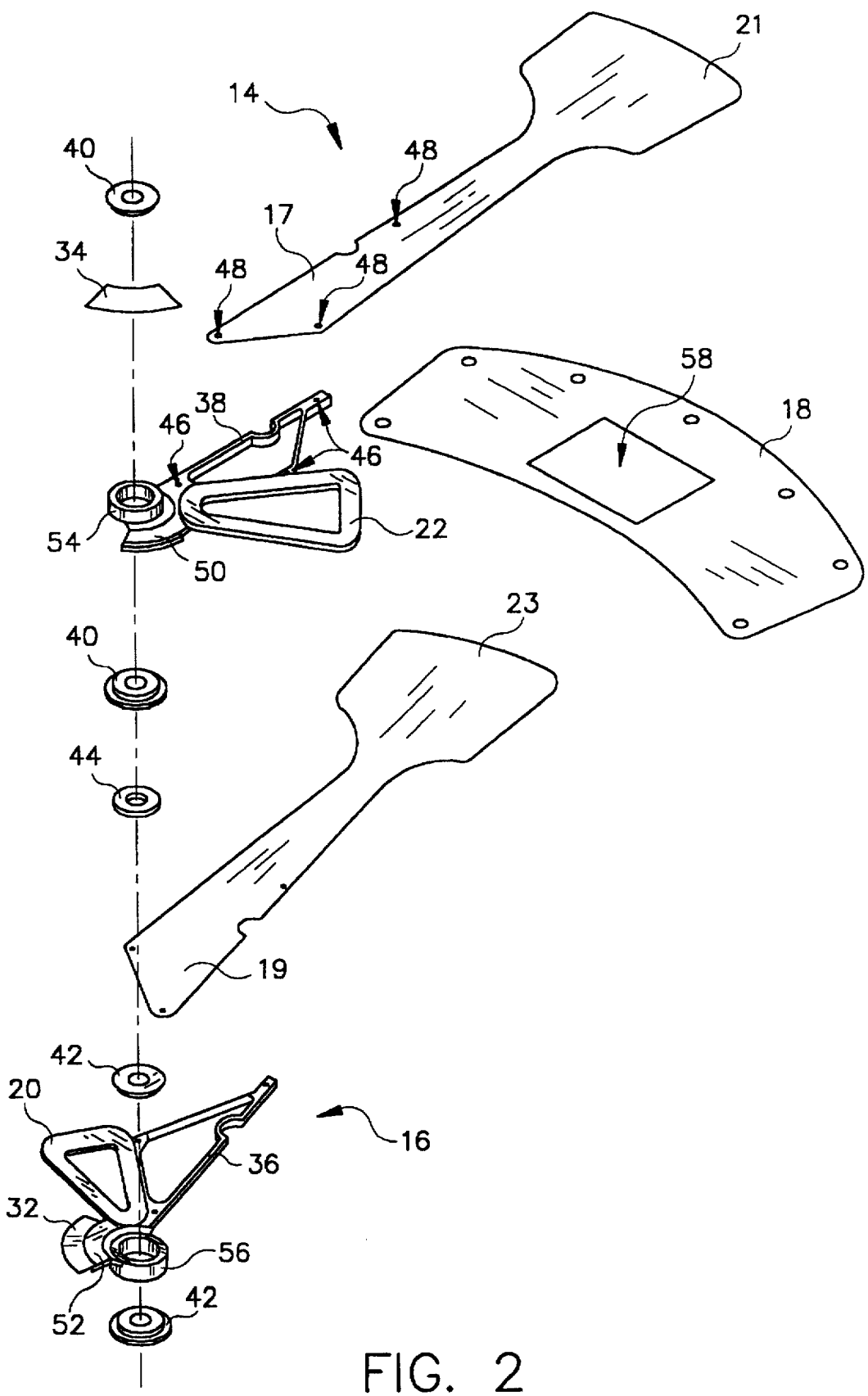
FIG. 2 is an exploded perspective view of a portion of FIG. 1.

A partially exploded view of blade assemblies 14 and 16 is illustrated in FIG. 2. Each blade assembly includes a shutter blade, actuator coil, and optical gradient density wedge mounted on a blade support structure, respectively 36, 38. A pair of miniature precision ball bearings 40, 42 are pressed into each side of a pivot 54, 56 of each blade assembly to provide a long life precision pivot. A spacer 44 is provided to separate the blade assemblies from each other. The blade support structures 36, 38 are made of 30% glass filled polycarbonate to provide strength and bondability. The support structures' minimizing inertia geometry is optimized to provide maximum strength when bonded to the blade.

Blades 17, 19 are aligned with their respective support structure, then bonded to the support structure using Loctite 442. A mechanical bond is then provided by over filling three glue pockets 46 provided in the support structure with epoxy (Cotronics 9000) through apertures 48 in the shutter blade. As such, "rivets" are formed which will retain the blade to the support structure even if the adhesive bond fails. Such a failure is possible because the shutter blade material (e.g. Soma Black) is preferably coated with antistatic compounds which reduce bond strength.

Coils 20, 22 are formed as follows. A copper wire covered with an inner and outer layer of plastic insulation is wrapped multiple times around a form. The outer plastic layer has a lower melting temperature than the inner plastic layer. The wrapped copper wire is then heated to a temperature sufficient to soften the outer plastic layer without substantially softening the inner plastic layer. Next, the wrapped, heated copper wire is cooled, causing the softened outer layers of the copper wire wraps to fuse together, thereby forming a uniform structure.

Figure 3:
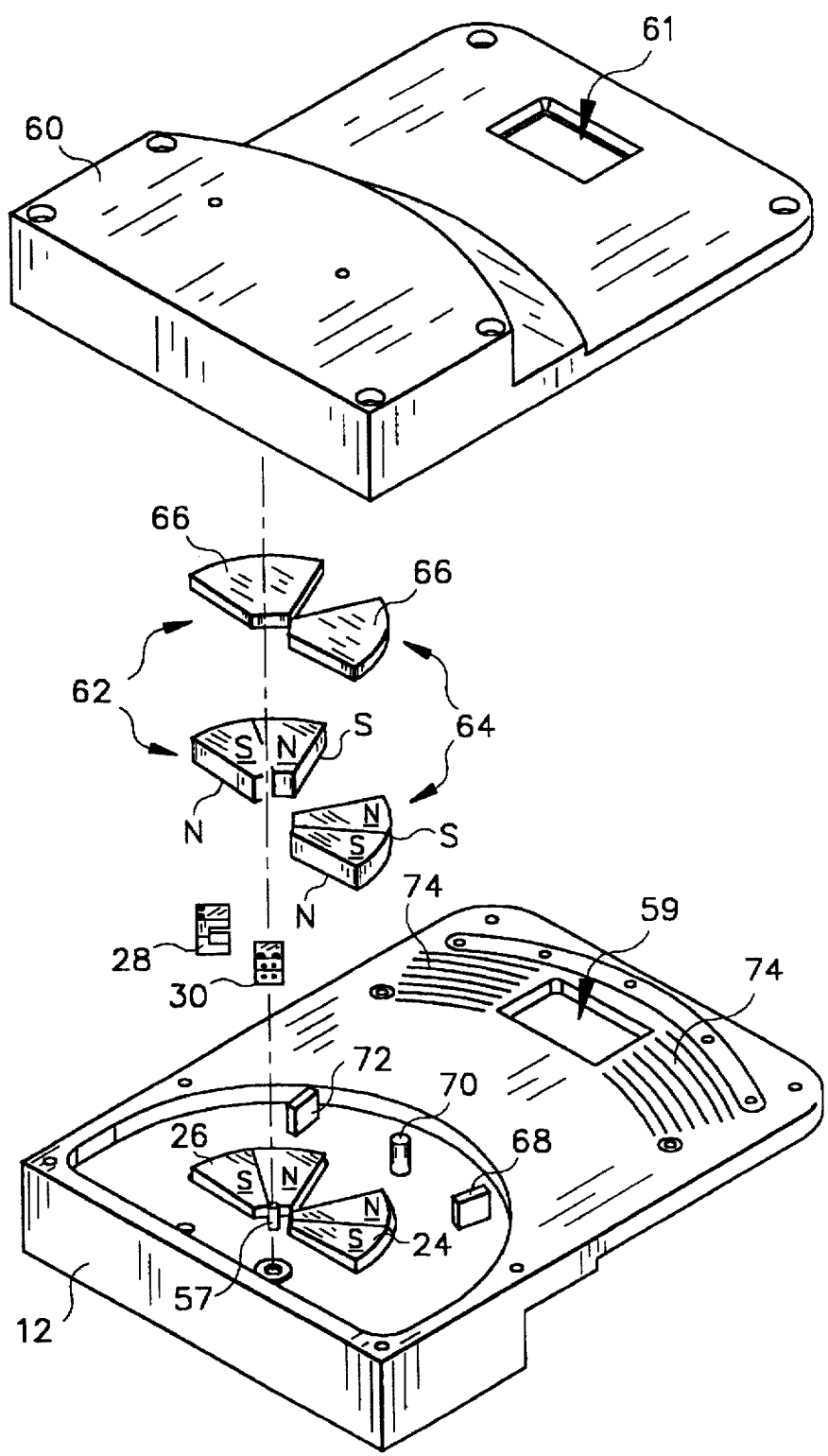
FIG. 3 is an exploded perspective view of a base, cover, permanent magnets, keepers and optical sensors of the shutter mechanism of FIG. 1.

Epoxy is used to bond the bobbinless self supported actuator coils into a pocket provided on a side of support structures 36, 38. Coils 20, 22 also add mechanical strength to their respective blade assembly. Each gradient wedge 32, 34 is glued to a respective radial tab 50, 52 of the associated support structure using Loctite 442. After pivot 56 of blade assembly 16 is pressed onto a pivot pin 57 on base 12 (see FIG. 3), blade separator 18 with an aperture 58 is mounted over blade 19. Spacer 44 is mounted on the pivot pin and then pivot 54 of blade assembly 14 is pressed onto the pivot pin. As such, blades 17, 19 rotate about a common axis FIG. 3 shows base 12 and a cover 60 without the blade assemblies in place. The base and cover each have a respective aperture 59, 61 which both align with aperture 58 in separator 18 when assembled. The base includes magnet assemblies 24, 26 mounted in pockets in the base. Cover 60 also includes a pair of magnet assemblies 62, 64 which are exploded out of the cover for viewing purposes. The magnet assemblies are normally housed in pockets in the cover. Each assembly in the base and cover is made up of two permanent magnets (Tri-Neo-27) and a keeper 66. The arrangement of the magnet polarity, with like poles of assemblies in the base adjacent to each other and like poles of assemblies in the cover adjacent to each other, provides minimum leakage between such assemblies and concentrates the magnetic flux in the gap where the coils are located. Each coil is thus sandwiched between a magnetic assembly in the base and a magnetic assembly in the cover. Using separate assemblies also allows a small gap to be realized which increases the gap flux density. Keepers 66 are relatively thick (¼") and made of hydrogen annealed carbon steel which remains unsaturated and minimizes leakage flux. These features provide a high efficiency magnet structure that permits a large torque to be obtained, resulting in extremely fast shutter speeds.

Sensors 28, 30 to detect blade position in conjunction with the optical gradient wedges are also mounted on the base. Their split construction allows the lower half to be mounted on base 12 before the blade assemblies are placed on pivot pin 57. The top half of each sensor is then mounted onto the lower half after mounting the blade assemblies, sandwiching the optical wedge between the sensor halves. Other functional features such as a triad of blade stops 68, 70, 72 are built into the base. Blade stop 70 is a centrally located single pin which serves as blade 19 maximum travel stop as well as blade 17 home position stop. Stop 72 is a home position stop for blade 19 while stop 68 is a maximum travel stop for blade 17.

Sets of tangential grooves 74 are machined into the base where blade 19 contacts the surface of the base. Although grooves are only required to the left of aperture 59, they are provided on the right also because of the manufacturing process. Grooves 74 prevent blade 19 from sticking to the base due to air pressure difference as they traverse the aperture at high velocities. A similar set of grooves (not shown) is provided on cover 60 to facilitate movement of blade 17. The limiting aperture of the shutter mechanism is provided by aperture 58 in separator 18 as opposed to apertures 59, 61 in the base and cover. Therefore, apertures 59, 61 should be slightly larger than the full aperture size of the shutter mechanism.

Figure 4:
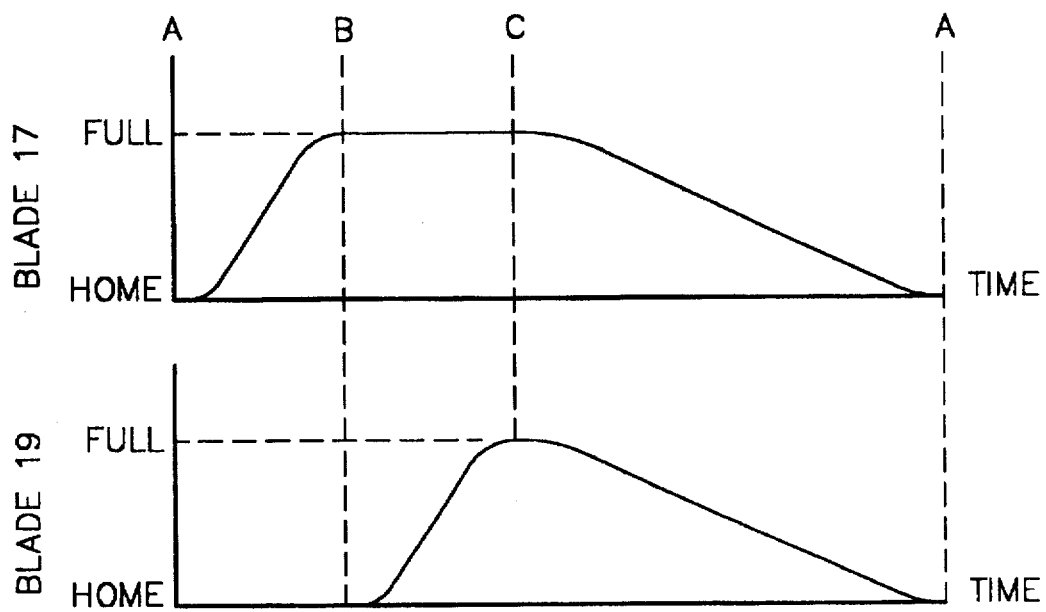
FIG. 4 is a pair of graphs plotting the position of each shutter blade versus time for a full aperture exposure.
Figure 5A:
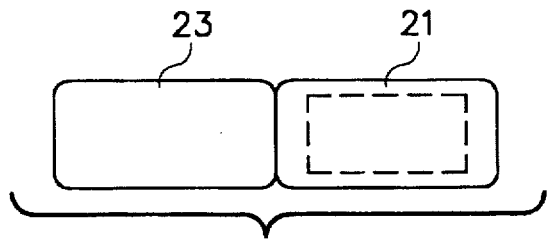
FIG. 5 is a schematic representation of the positions of the shutter blades during the full aperture exposure plotted in FIG. 4.
Figure 5B:
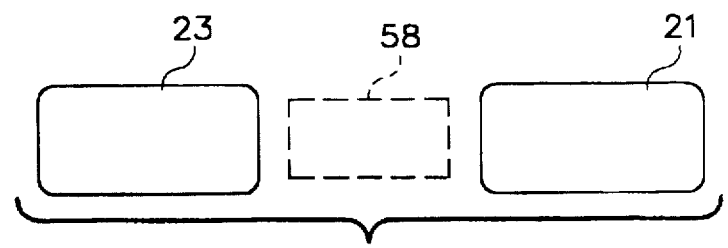
Figure 5C:
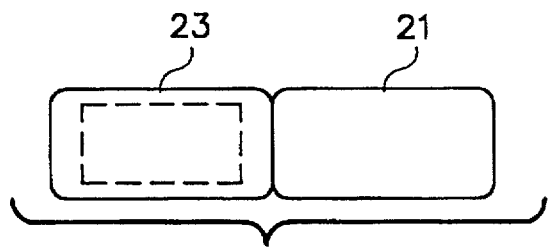

Shutter operation for a full open (flash synch) aperture is illustrated in FIGS. 4 and 5. Blade motion is plotted on the graphs in FIG. 4 while the physical blade position is shown in FIG. 5. The exposure sequence begins at A when a controller starts blade 17 in motion. The profile illustrated is obtained by applying a constant acceleration until blade 17 is half way through its travel, then a constant deceleration is applied until blade 17 completes its travel. This results in a minimum opening (or closing) time while eliminating impacting the stops. Such an arrangement is desirable because vibration due to blade impact at the stops would otherwise cause camera shake and blur the image. At position B, portion 21 of blade 17 is fully opened and portion 23 of blade 19 begins its travel to close the aperture, stopping at position C. Both blades are moved back to position A before starting the next exposure sequence. Alternatively, the next exposure can be started from position C, by starting blade 19 and following with blade 17.

Figure 6:
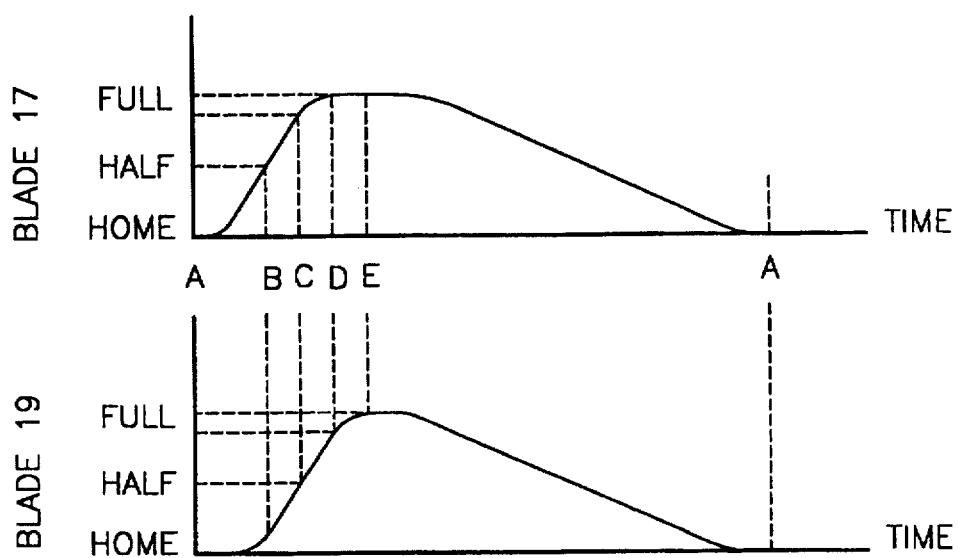
FIG. 6 is a pair of graphs plotting the position of each shutter blade versus time for a half aperture exposure.

Higher effective shutter speeds are obtained by having the blades form a traveling slit which traverses the aperture. This operating mode is illustrated in FIGS. 6 and 7, where the blades still travel at maximum speed but form a slit that is half the aperture width, resulting in an effective shutter speed that is twice as fast as the full aperture speed. Again, the blades start at home position A. When portion 21 of blade 17 reaches its half way point, position B, blade 19 motion is initiated. At point C portion 21 nearly clears the aperture while portion 23 of blade 19 reaches the center (half closed) of aperture 58. The exposure sequence is nearly complete at D, as portion 23 nears the end of its travel. At point E the exposure is complete and the sequence may be terminated in the same manner as mentioned in the previous paragraph.

Figure 8:
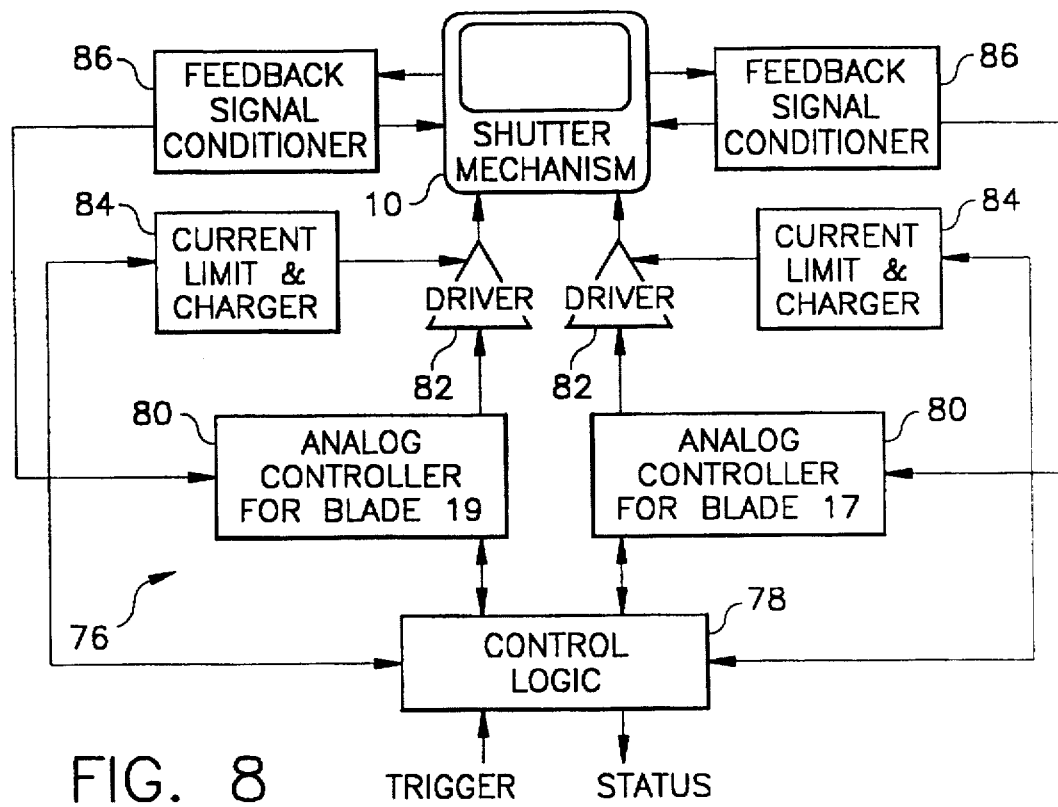
FIG. 8 is a block diagram of a controller for operating the shutter mechanism of FIGS. 1–3.
Figure 7A:
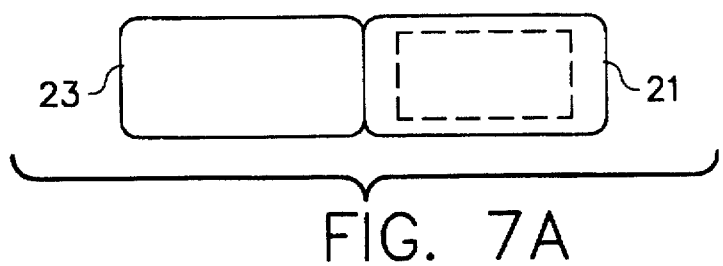
FIG. 7 is a schematic representation of the positions of the shutter blades during the half aperture exposure plotted in FIG. 6.
Figure 7B:
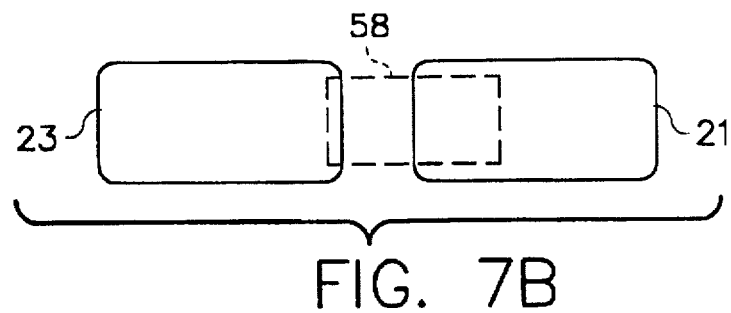
Figure 7C:
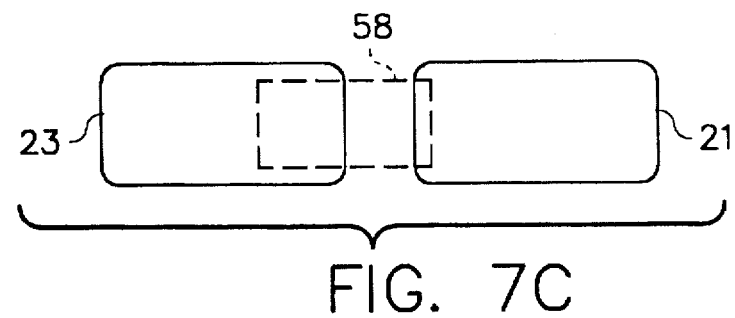
Figure 7D:
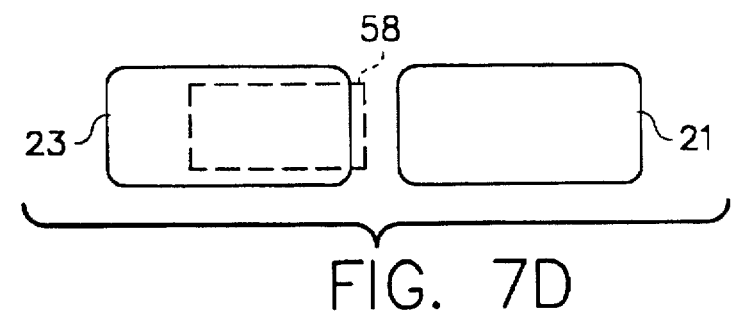
Figure 7E:
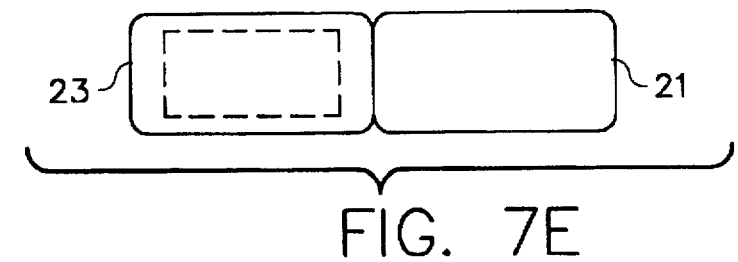

FIG. 8 shows a block diagram of a typical controller 76 for controlling operation of the shutter mechanism 10. Controller 76 has two identical controller/driver arrangements sequenced by a digital logic controller/interface 78. Any analog (or digitally implemented) controller 80 may be used to control the motion of each blade 17, 19. Drivers 82 are typically power operational amplifiers capable of driving actuator coils 20, 22 at the desired electrical current levels. Power for the drivers are obtained by charging a reservoir capacitor through a current limiter 84. Several amps of current are available during the short exposure time by discharging the capacitors. A constant current source to drive the LEDs of sensors 28, 30 and a trans-impedance amplifier to convert the photodiode detector current from the sensors to an output voltage are included in a feedback signal conditioner 86. Control logic sequences the analog controllers to open blade 17 at the rising edge of a square wave trigger pulse, caused by a camera operator pressing a shutter button, and close blade 19 at the pulse's falling edge. The period of the square wave determines the amount of exposure. A status line provides a digital feedback signal to the camera electronics, preventing the shutter from being triggered until an exposure sequence is complete and the reservoir capacitors are fully charged.

The invention has been described with reference to a preferred embodiment. However, it will be appreciated that variations and modifications can be effected by a person of ordinary skill in the art without departing from the scope of the invention.

PARTS LIST 10 shutter mechanism
12 base
14, 16 blade assemblies
17, 19 shutter blades
18 aperture
20, 22 actuator coils
21, 23 blade light regulating portions
24, 26 magnet assemblies
28, 30 optical sensors
32, 34 optical gradient density wedges
36, 38 blade support structure
40, 42 ball bearings
44 spacer
46 glue pockets
48 apertures
50, 52 radial tabs
54, 56 pivots
57 pivot pin
58, 59, 61 apertures
60 cover
62, 64 magnet assemblies
66 keepers
68, 70, 72 blade stops
74 grooves
76 controller
78 control logic
80 analog controllers
82 drivers
84 current limiters
86 feedback signal conditioner

We claim:

1. A device for controlling an amount of light allowed to reach a photosensitive surface, comprising a movable light regulating member, an electrically conductive coil mounted to move with the member, a first permanent magnet having a north pole located adjacent a first side of the coil, and a second permanent magnet having a south pole located adjacent the first side of the coil, is characterized by:

third and fourth permanent magnets located adjacent a second side of the coil, a north pole of the third magnet being located opposite the south pole of the second magnet, a south pole of the fourth magnet being located opposite the north pole of the first magnet, such that when electrical current is passed through the coil in one direction, the member is moved in a first direction, and when electrical current is passed through the coil in another direction, the member is moved in a second direction.

2. The device of claim 1, wherein said light regulating member is a first light regulating member and said coil is a first coil, and further comprising:

a second movable light regulating member;

a second electrically conductive coil mounted to move with the second member;

fifth and sixth permanent magnets, a north pole of the fifth magnet and a south pole of the sixth magnet being located adjacent a first side of the second coil; and seventh and eighth permanent magnets located adjacent a second side of the second coil, a north pole of the seventh magnet being located opposite the south pole of the sixth magnet, a south pole of the eighth magnet being located adjacent the north pole of the fifth magnet, such that when electrical current is passed through the second coil in one direction, the second member is moved in a first direction, and when electrical current is passed through the second coil in the other direction, the member is moved in a second direction.

3. The device of claim 2, wherein the electrical current flowing in the first coil is controllable independent of the electrical current flowing in the second coil.

4. The device of claim 2, wherein the first and second coils do not overlap during movements of the first and second members, such that movement of the members can be independently controlled with reduced electromagnetic interference between the coils.

5. The device of claim 2, further comprising:

a separator member having an aperture for passing light towards the photosensitive surface, each of the light regulating members having a light regulating portion respectively located adjacent opposite sides of the separator member so that the light regulating portions of the members are separated from each other and will not collide with each other during movement of the light regulating members.

6. The device of claim 2, wherein the first and second light regulating members rotate about a common axis.

7. The device of claim 1, further comprising:

a radiation emitter;

a radiation detector for detecting radiation emitted by the radiation emitter; and an optical gradient wedge mounted to move with the light regulating member, the wedge controlling an amount of radiation passing from the emitter to the detector based on where the radiation is incident on the wedge, such that the position of the light regulating member can be determined using an output signal of the detector.

8. The device of claim 1, further comprising:

a base for supporting the light regulating member, the base having a plurality of grooves over which a light regulating portion of the member passes during movement of the member, the grooves reducing air resistance to movement of the light regulating member.

* * * * *